(12) United States Patent
Donderici et al.

(10) Patent No.: US 10,001,006 B2
(45) Date of Patent: Jun. 19, 2018

(54) RANGING USING CURRENT PROFILING

(71) Applicant: Halliburton Energy Services, Inc., Houston, TX (US)

(72) Inventors: Burkay Donderici, Houston, TX (US); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 326 days.

(21) Appl. No.: 14/421,397

(22) PCT Filed: Dec. 30, 2013

(86) PCT No.: PCT/US2013/078309
§ 371 (c)(1),
(2) Date: Feb. 12, 2015

(87) PCT Pub. No.: WO2015/102578
PCT Pub. Date: Jul. 9, 2015

(65) Prior Publication Data
US 2016/0258276 A1   Sep. 8, 2016

(51) Int. Cl.
*G01V 3/00* (2006.01)
*E21B 47/022* (2012.01)
(Continued)

(52) U.S. Cl.
CPC .......... *E21B 47/02224* (2013.01); *E21B 7/04* (2013.01); *E21B 43/2406* (2013.01);
(Continued)

(58) Field of Classification Search
CPC ... G01V 3/20; G01V 3/22; G01V 3/24; G01V 3/26; G01V 3/18; G01V 3/02;
(Continued)

(56) References Cited

U.S. PATENT DOCUMENTS 3,760,260 A * 9/1973 Schuster ................ G01V 3/24
                                                 324/373
4,372,398 A * 2/1983 Kuckes ................ E21B 47/02
                                                 166/66.5
(Continued)

FOREIGN PATENT DOCUMENTS

WO   WO 0162870 A1 *  8/2001 ........... C10G 25/003
WO   WO-0162870 A1    8/2001
(Continued)

OTHER PUBLICATIONS

"International Application Serial No. PCT/US2013/078309, International Search Report dated Sep. 29, 2014", 12 pgs.
(Continued)

*Primary Examiner* — Patrick Assouad
*Assistant Examiner* — Sean Curtis
(74) *Attorney, Agent, or Firm* — Gilliam IP PLLC

(57) ABSTRACT

Systems and methods provide a mechanism to provide enhanced features for well ranging. Various embodiments may include generating a current profile for a target well, acquiring magnetic signals at a second well, and determining ranging to the target well with respect to the second well using the magnetic signals and the current profile. Additional apparatus, systems, and methods are disclosed.

42 Claims, 8 Drawing Sheets

(51) Int. Cl.
  *E21B 7/04* (2006.01)
  *E21B 43/24* (2006.01)
  *E21B 43/30* (2006.01)
  *E21B 47/024* (2006.01)
  *G01V 3/02* (2006.01)

(52) U.S. Cl.
  CPC .......... *E21B 43/305* (2013.01); *E21B 47/024* (2013.01); *E21B 47/02216* (2013.01); *G01V 3/02* (2013.01)

(58) Field of Classification Search
  CPC . G01V 3/081; G01V 3/12; G01V 3/00; G01V 9/00; E21B 49/005; E21B 49/08; G01N 33/2823; G01N 33/241
  USPC ...................................... 324/323–377; 175/45
  See application file for complete search history.

(56) References Cited

U.S. PATENT DOCUMENTS

| | | | | |
|---|---|---|---|---|
| 4,875,015 A * | 10/1989 | Ward | G01V 3/20 | 324/323 |
| 5,064,006 A * | 11/1991 | Waters | E21B 7/068 | 175/45 |
| 5,218,301 A * | 6/1993 | Kuckes | E21B 47/02 | 324/207.26 |
| 5,589,775 A * | 12/1996 | Kuckes | E21B 47/02216 | 166/66.5 |
| 5,923,170 A * | 7/1999 | Kuckes | E21B 47/02216 | 175/45 |
| 6,991,045 B2 * | 1/2006 | Vinegar | B09C 1/02 | 166/66.5 |
| 7,063,145 B2 * | 6/2006 | Veenstra | B09C 1/02 | 166/250.01 |
| 7,165,615 B2 * | 1/2007 | Vinegar | B09C 1/02 | 166/302 |
| 7,665,544 B2 * | 2/2010 | Forgang | G01V 3/20 | 175/50 |
| 7,689,363 B2 * | 3/2010 | Itskovich | G01V 3/20 | 175/50 |
| 7,703,548 B2 * | 4/2010 | Clark | G01V 3/26 | 175/45 |
| 7,812,610 B2 * | 10/2010 | Clark | G01V 3/26 | 324/338 |
| 8,011,451 B2 * | 9/2011 | MacDonald | E21B 43/24 | 175/45 |
| 8,063,641 B2 * | 11/2011 | Clark | E21B 47/02216 | 324/345 |
| 8,113,298 B2 * | 2/2012 | Kuckes | E21B 47/022 | 175/315 |
| 8,159,226 B2 * | 4/2012 | Sponchia | E21B 34/06 | 166/250.11 |
| 8,390,294 B2 * | 3/2013 | Gold | G01V 3/24 | 324/323 |
| 8,393,412 B2 * | 3/2013 | Camwell | E21B 47/02208 | 175/45 |
| 8,427,162 B2 * | 4/2013 | Bespalov | E21B 47/022 | 324/326 |
| 8,726,986 B2 * | 5/2014 | Parsche | E21B 43/2401 | 166/248 |
| 8,754,651 B2 * | 6/2014 | Habashy | G01V 3/24 | 324/339 |
| 8,844,648 B2 * | 9/2014 | Bittar | E21B 47/022 | 175/323 |
| 9,360,583 B2 * | 6/2016 | Donderici | G01V 1/46 | |
| 9,400,339 B2 * | 7/2016 | Bloemenkamp | G01V 3/24 | |
| 2004/0085625 A1 | 5/2004 | Motoshima et al. | | |
| 2008/0041626 A1 | 2/2008 | Clark | | |
| 2008/0128166 A1 * | 6/2008 | Forgang | G01V 3/20 | 175/50 |
| 2009/0189617 A1 * | 7/2009 | Burns | E21B 43/24 | 324/649 |
| 2009/0194282 A1 * | 8/2009 | Beer | E21B 43/24 | 166/272.7 |
| 2009/0194286 A1 * | 8/2009 | Mason | E21B 43/24 | 166/302 |
| 2009/0194287 A1 * | 8/2009 | Nguyen | E21B 43/24 | 166/302 |
| 2009/0194333 A1 * | 8/2009 | MacDonald | E21B 43/24 | 175/45 |
| 2009/0272526 A1 * | 11/2009 | Burns | C10G 21/22 | 166/248 |
| 2009/0272533 A1 * | 11/2009 | Burns | C10G 21/22 | 166/272.7 |
| 2009/0272536 A1 * | 11/2009 | Burns | C10G 21/22 | 166/302 |
| 2009/0272578 A1 * | 11/2009 | MacDonald | C10G 21/22 | 175/26 |
| 2009/0284260 A1 * | 11/2009 | Sponchia | E21B 43/10 | 324/333 |
| 2010/0023268 A1 * | 1/2010 | Gold | G01V 3/24 | 702/9 |
| 2010/0044108 A1 * | 2/2010 | Bespalov | E21B 47/022 | 175/24 |
| 2010/0071903 A1 * | 3/2010 | Prince-Wright | C10G 21/22 | 166/302 |
| 2010/0071904 A1 * | 3/2010 | Burns | C10G 21/22 | 166/302 |
| 2010/0108310 A1 * | 5/2010 | Fowler | E21B 43/2401 | 166/245 |
| 2010/0155139 A1 * | 6/2010 | Kuckes | E21B 47/02216 | 175/45 |
| 2011/0308859 A1 * | 12/2011 | Bittar | E21B 47/022 | 175/45 |
| 2012/0119744 A1 * | 5/2012 | Habashy | G01V 3/20 | 324/339 |
| 2012/0234605 A1 * | 9/2012 | Donderici | G01V 1/46 | 175/73 |
| 2013/0277045 A1 * | 10/2013 | Parsche | E21B 43/2401 | 166/248 |
| 2013/0293234 A1 * | 11/2013 | Bloemenkamp | G01V 3/24 | 324/355 |
| 2013/0293235 A1 * | 11/2013 | Bloemenkamp | G01V 3/24 | 324/356 |
| 2013/0319659 A1 * | 12/2013 | Freedman | E21B 7/04 | 166/250.01 |
| 2014/0090834 A1 * | 4/2014 | Sultenfuss | E21B 43/2401 | 166/248 |
| 2015/0160365 A1 * | 6/2015 | Donderici | E21B 47/0905 | 324/351 |
| 2015/0268371 A1 * | 9/2015 | Donderici | E21B 47/02216 | 324/346 |
| 2016/0025887 A1 * | 1/2016 | Rodney | E21B 47/02 | 324/339 |
| 2016/0041293 A1 * | 2/2016 | Boudah | G01V 3/26 | 702/7 |
| 2016/0041294 A1 * | 2/2016 | Wu | E21B 33/13 | 324/338 |
| 2016/0047224 A1 * | 2/2016 | Wilson | E21B 43/2406 | 175/45 |
| 2016/0097272 A1 * | 4/2016 | Moss | E21B 43/2406 | 324/346 |
| 2016/0103240 A1 * | 4/2016 | Wu | G01V 3/081 | 324/346 |
| 2016/0258275 A1 * | 9/2016 | Wu | G01V 3/26 | |
| 2016/0258276 A1 * | 9/2016 | Donderici | E21B 47/02216 | |
| 2016/0259079 A1 * | 9/2016 | Wilson | G01V 1/42 | |

(56) References Cited

U.S. PATENT DOCUMENTS

2016/0265343 A1* 9/2016 Donderici ............. E21B 43/305
2016/0273337 A1* 9/2016 Donderici ......... E21B 47/02216
2016/0273340 A1* 9/2016 Roberson ................ G01V 3/26
2016/0273345 A1* 9/2016 Donderici ................ E21B 7/04

FOREIGN PATENT DOCUMENTS

WO        2007145859 A2    12/2007
WO     WO 2007145859 A2 * 12/2007 ....... E21B 47/02216

OTHER PUBLICATIONS

"International Application Serial No. PCT/US2013/078309, Written Opinion dated Sep. 29, 2014", 8 pgs.
"Australian Application Serial No. 2013409495, First Examiners Report dated Jul. 20, 2016", 2 pgs.
"Candian Application Serial No. 2,930,399; Office Action dated Mar. 1, 2017", 4 pages.
"Australian Application Serial No. 2013409495; Second Examination Report dated May 16, 2017.", 3 pages.
RU Application Serial No. 2016119143, Decision on Grant, dated Oct. 11, 2017, 22 pages (English Translation Included).
CA Application Serial No. 2930399, Examiner's Letter, Nov. 16, 2017, 4 pages.

* cited by examiner

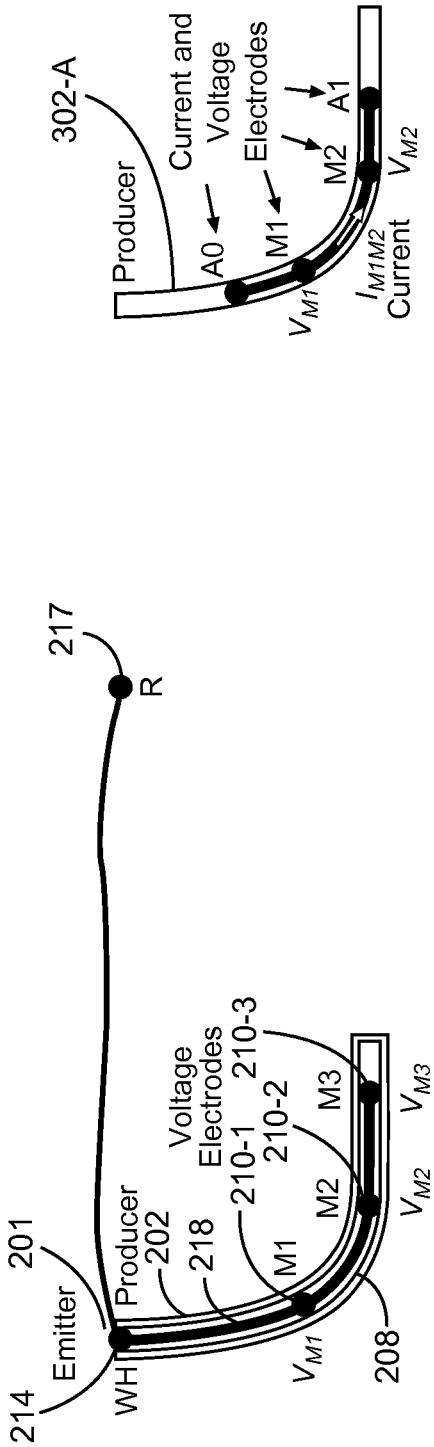

Currents $I(z_{A0}, z_{A1})$
$V(z_{A0}, z_{A1}, z_{A0}, z_{A1})$ $Z(z_{A0}, z_{A1}) \approx \dfrac{V(z_{A0}, z_{A1}, z_{A0}, z_{A1})}{I(z_{A0}, z_{A1})}$ Currents $I(z_{A0}, z_{A1})$
$I(z_{A0}, z_{A2})$
$V(z_{A0}, z_{A1}, z_{A0}, z_{A1})$
$V(z_{A0}, z_{A2}, z_{A0}, z_{A2})$ $Z(z_{A0}, z_{A1}) \approx \dfrac{V(z_{A0}, z_{A1}, z_{A0}, z_{A1})}{I(z_{A0}, z_{A1})}$ $Z(z_{A0}, z_{A2}) \approx \dfrac{V(z_{A0}, z_{A2}, z_{A0}, z_{A2})}{I(z_{A0}, z_{A2})}$

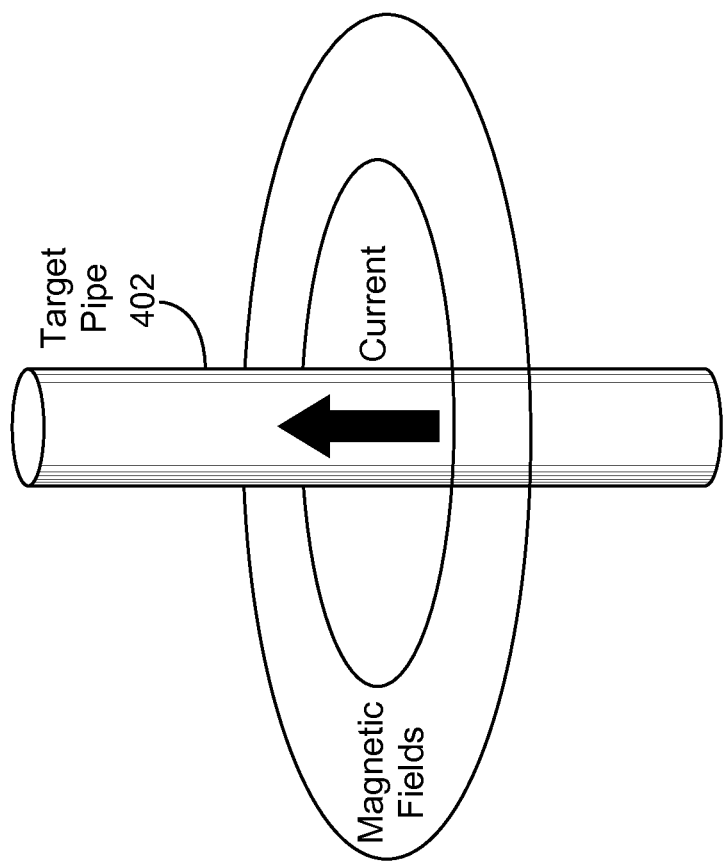
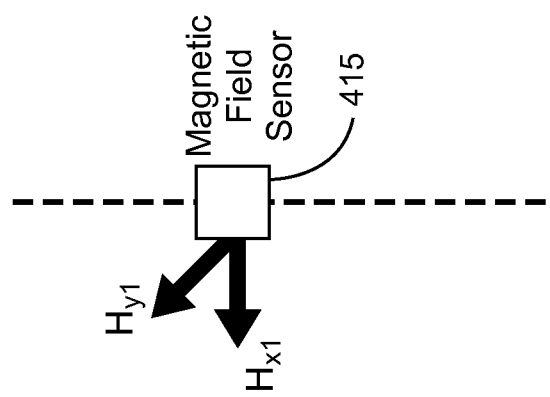
Fig. 4

RANGING USING CURRENT PROFILING

PRIORITY APPLICATIONS

This application is a U.S. National Stage Filing under 35 U.S.C. 371 from International Application No. PCT/US2013/078309, filed on 30 Dec. 2013, which application is incorporated herein by reference in its entirety.

TECHNICAL FIELD

The present invention relates generally to apparatus and methods associated with measurements related to oil and gas exploration.

BACKGROUND

As the easy-to-access and easy-to-produce hydrocarbon resources have been depleted over the last century, more and more difficult wells remain. Moreover, the world's hydrocarbon demand is continuously growing. Meeting this demand requires development of more advanced recovery procedures, one of which is the steam assisted gravity drainage (SAGD) application. SAGD addresses the mobility problem of the heavy oil wells by injection of high pressure and high temperature steam, which reduces viscosity of the oil and allows easy extraction. This injection is performed from a wellbore (injector) that is drilled in parallel to the producing well (producer) at a distance in the order of a few meters from each other. The placement of the injector needs to be achieved with very small margin in distance, since getting it too close would expose the producing well to very high pressure and temperature, and getting it too far would reduce efficiency of the process. It is well known that traditional surveying techniques suffer from a widening cone of uncertainty as the well gets longer and they cannot achieve the precision in placement that is required.

BRIEF DESCRIPTION OF THE DRAWINGS

FIG. 2 is a schematic representation of an example of voltage profiling, in accordance with various embodiments.

FIGS. 3A-3C are schematic representations of examples of impedance profiling, in accordance with various embodiments.

FIG. 4 is a schematic representation of an absolute measurement principle with respect to a target pipe, in accordance with various embodiments.

DETAILED DESCRIPTION

Figure 1A:
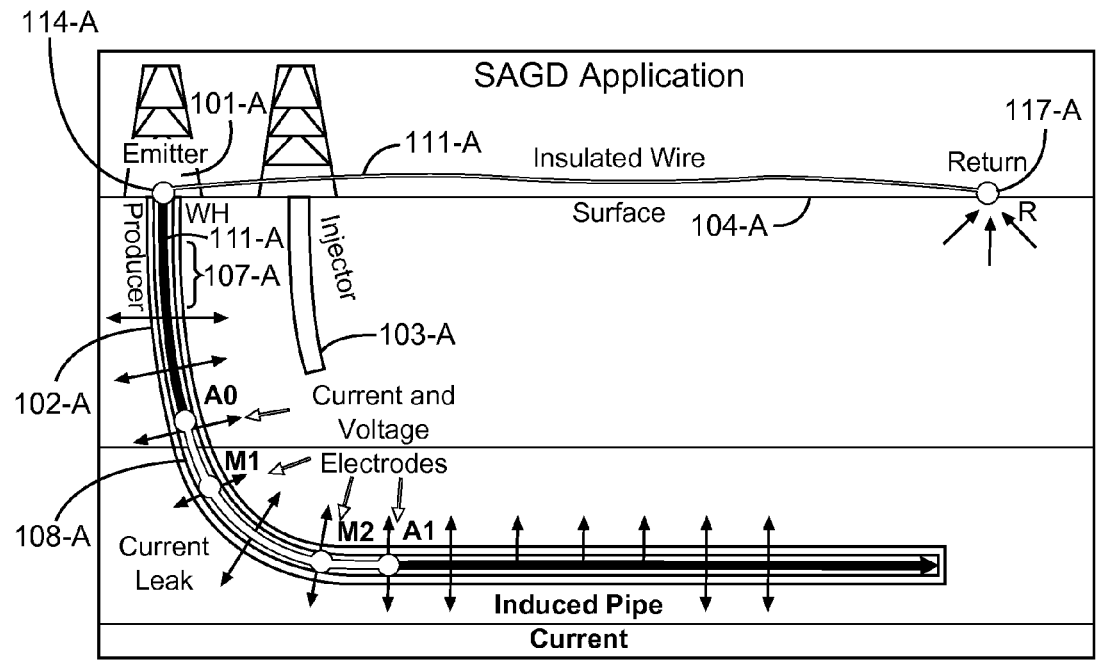
FIGS. 1A-1B are schematic representations of an example surface-excitation single well ranging system with respect to current profiling and with respect to distance provided from absolute measurement, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In a recent approach, a single well solution provides currents that are injected from the surface. However, this method requires a gradient measurement for accurate distance calculation, which requires a very sensitive magnetic field measurement and very large currents to be injected from the surface.

Herein, a producing well may be referred to as a production well, a producer well, or a producer. An injecting well may be referred to as an injection well, an injector well, or an injector.

In various embodiments, ranging techniques may include generating a current profile for a target well, acquiring magnetic signals at a second well, and determining ranging to the target well with respect to the second well using the magnetic signals and the current profile. A production well can be a target well for which distance and direction from another well, such as an injection well, is to be determined. In various embodiments, an apparatus and process, as taught herein, can utilize a wireline production tool with electrodes that can measure voltages due to surface excitation and can inject currents to a producer well to measure pipe resistance along the well. This procedure allows accurate distance calculation from absolute measurements, which has significantly larger range compared to a gradient measurement. This ranging operation may be separated into four parts: (i) profiling of surface excitation voltages in a producer; (ii) profiling of impedances along the producer; (iii) calculation of currents on the producer; and (iv) calculation of distance from the currents.

With respect to voltage profiling, the surface excitation can be setup and activated exactly the same way it will be in the regular operation (same electrode locations, same frequencies). Ideally, this is performed after the producer is drilled; however it is also possible to the setup and activation after most of the electrically active sections are drilled. It is also preferred to do/repeat this operation after injector is drilled since inclusion of a new BHA or casing sections in the injector as part of drilling may affect the voltages. If the voltage profiling is performed before the injector is drilled, a correction on the profiled voltages can be performed to take into account the effect of inclusion of injector casing or BHA. This will be explained in more detailed in discussions to follow.

The source can be either voltage controlled or current controlled and can alternate with very low frequencies in the order of 0.02-250 Hz. In some applications, higher frequencies on the order of 250 Hz to 10 GHz may also be used. In such high frequency applications, measurements may be made during drilling due to relatively small interference of the influence of earth's magnetic fields. However, high frequencies can result in significantly large current leaks on the pipe and they cannot be used with deep applications unless an insulated excitation line is brought downhole. The source can be located at the surface and can be connected to the well via an insulated cable that is clamped to a fixed location in the well.

Figure 1B:
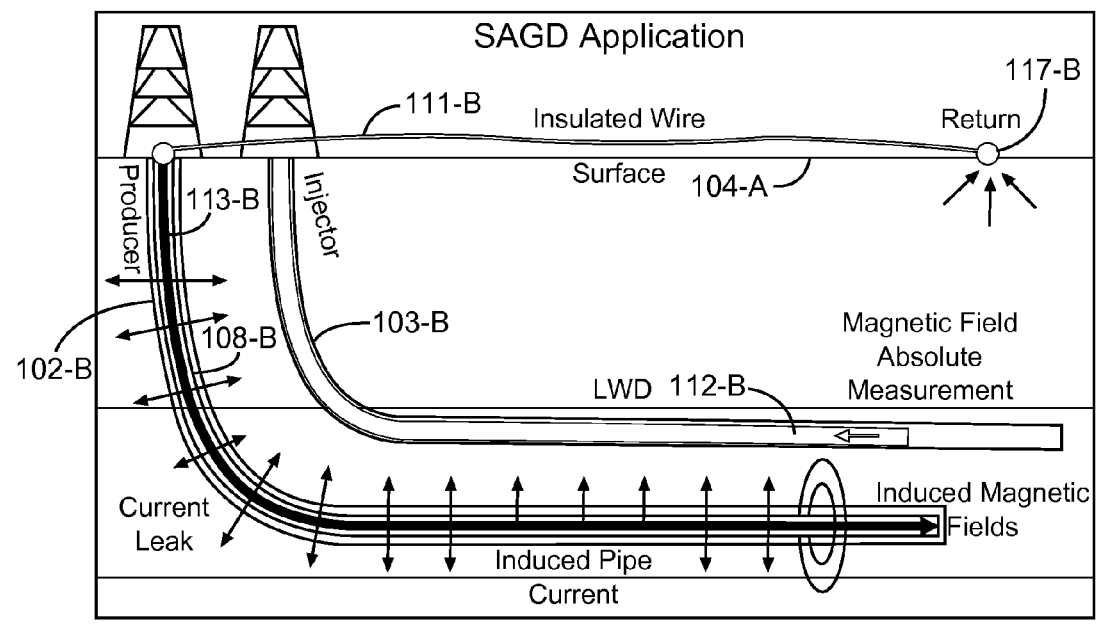

FIGS. 1A-1B are schematic representations of an example surface-excitation single well ranging system with respect to current profiling and with respect to distance provided from absolute measurement. FIG. 1A shows a producer 102-A in which a pipe 108-A is disposed, where the producer 102-A is separated from an injector 103-A. The producer 102-A is a target well for which distance and direction from another well, such as injector 103-A, is to be determined. In an embodiment, an insulated wire 111-A can be connected to a well-head 114-A or area 107-A surrounding the well-head 114-A at surface 104-A or at very shallow depths that are less than 20 feet, as shown in FIG. 1A. The insulated wire 111-A can also be connected to return 117-A. In this case, the current is delivered to the pipe 108-A of the producer 102-A through an emitter 101-A at the wellhead 114-A and the shallow formations 107-A. With current from current electrode A0 flowing to current electrode A1, a voltage difference can be measured between voltage electrodes M1 and M2.

FIG. 1B shows a producer 102-B in which a target pipe 108-B is disposed, where the producer 102-B is separated from an injector 103-B. In another embodiment, current is delivered from an insulated cable 113-B that is deployed in the target pipe 108-B, preferably in the vicinity of the area that is targeted for SAGD drilling, as shown in FIG. 1B. The insulated cable 113-B can be coupled to a return 117-B at surface 104-B by an insulated wire 111-B. Magnetic fields induced by current in the target pipe 108-B can be detected in a logging-while-drilling (LWD) arrangement 112-B in the injector 103-B. The producer 102-B is the target well for which distance and direction from another well, such as injector 103-B, is to be determined.

In both cases shown in FIGS. 1A-1B, current traveling on the pipe 108-A, 108-B in the producer 102-A, 102-B, respectively, gradually leaks to the adjacent formations and follows a substantially exponential decay provided that they are far from the ends of the pipe. It is known that such current excitation can reach distances as large as 10000 feet and beyond, which is a good fit for the SAGD application. In order to minimize resistance of the load that is connected to the source, contact can be carefully designed to reduce contact resistance as much as possible. In the case of downhole excitation, a mechanical clamp can be used. In the case of pipe excitation, a long piece of conductive material can be placed to the pipe floor and it can be pushed against the pipe with the help of gravity or by any other available conveyance methods.

FIG. 2 is a schematic representation of an example of voltage profiling. After setting up an excitation, a set of voltage electrodes 210-1, 210-2, and 210-3 can be lowered on a wireline 218 into a pipe 208 of a producer 202. More than three electrodes can be used. These electrodes make measurement of voltage differentials across the pipe 208 of the producer 202. Any combination of voltage differentials in between a plurality of electrodes can be considered. FIG. 2 shows an example arrangement having three voltage electrodes 210-1, 210-2, and 210-3, disposed in the producer 202, providing voltage differences between two locations with respect to current injected at a selected location and returned to a selected return location. In FIG. 2, the three voltage electrodes 210-1, 210-2, and 210-3 can be operated with respect to voltages V(z1, z2, z3, z4) that can be measured, where z1 is the current injector point location, z2 is the current return location, z3 is the measurement point 1 location, and z4 is the measurement point 2 location. Voltage V(z1, z2, z3, z4) is the voltage difference between the measurement point 1 location and measurement point 2 location. It is noted here that z can be any type of variable that represents position, such as measured depth, true depth, vertical section, etc. In particular, FIG. 2 shows three voltages that can be measured with current injection from emitter 201 at well head 214 (WH) and current returned at location 217 (R). The three measurements can include voltage difference (difference between $V_{M1}$ and $V_{M2}$) between locations M1 and M2, voltage difference (difference between $V_{M2}$ and $V_{M3}$) between locations M2 and M3, and voltage difference (difference between $V_{M1}$ and $V_{M3}$) between locations M1 and M3.

Ideally, the electrodes can be spaced apart large enough to allow a voltage measurement with reasonably large signal to noise ratio; however, it needs to be small enough to give the voltage profiling resolution that is required for accurate operation. Ideal separation can range between 6 inches and 200 feet. Electrodes can be non-uniformly distributed (for example logarithmic distribution) for capturing the voltage across a range of distances. In an alternative type of measurement, at least one of the electrodes may be affixed to the well instead of being placed on the tool. Such electrode may be placed at the surface or at any other location in the well. With such placement, difference of multiple voltage measurements that are referenced to the affixed electrode may be subtracted from each other to obtain other voltage measurements. After a set of discrete voltage difference measurements are obtained, they can be interpolated to obtain a continuous distribution of voltage across the producer. This distribution can provide a voltage profile.

Figures 3B, 3C:

In addition to voltage profiling discussed above, impedance profiling can be conducted. The impedance profiling can be conducted after voltage profiling. FIGS. 3A-3C are schematic representations of examples of impedance profiling. After voltage profiling, the surface excitation can be turned off and current injection electrodes can be lowered to the producer as shown in FIGS. 3A-3C. These electrodes can be realized as a part of the same or a different electrode set that was used for voltage profiling. Current can be injected to the producer well casing from one side and returned to another electrode further down the producer. The voltage drop across the producer is measured from same or separate electrodes.

Measurement of voltage from the same electrodes used in current excitation may create contact resistance issues. As a result, a four electrode configuration that is shown in FIG. 3A can be used. FIG. 3A shows a producer 302-A in which current electrodes A0 and A1 and voltage electrodes M1 and M2 are disposed. The current $I_{M1M2}$ is provided by the current electrodes A0 and A1 for voltage difference between $V_{M1}$ at voltage electrode M1 and $V_{M2}$ at voltage electrode M2 to be measured. In the four electrode configuration of FIG. 3A, the current injectors A0 and A1 need to be placed as close as possible to the measurement electrodes M1 and M2 to reduce the effect of current leaks between the electrodes. As shown in FIG. 3A, the impedance can be determined by the ratio of the voltage between electrodes M1 and M2 for current injected from A0 to A1 and the current injected from A0 to A1.

In cases where contact resistance is expected to be lower, two other configurations, as shown in FIGS. 3B and 3C, can be used. FIG. 3B shows a producer 302-B in which current electrodes A0 and A1 are disposed. In this case, current electrodes A0 and A1 are also the voltage electrodes for the current $I_{A0}$ injected from electrode A0 to electrode A1. The current $I_{A0}$ is provided by the current electrodes A0 and A1 for voltage difference between $V_{A0}$ at voltage electrode A0 and $V_{A1}$ at voltage electrode A1 to be measured. As shown in FIG. 3B, the impedance can be determined by the ratio of the voltage between electrodes A0 and A1 for current injected from A0 to A1 and the current injected from A0 to A1.

FIG. 3C shows a producer 302-C in which electrodes A0, A1, and A2 are disposed. In this case, current electrodes A0 and A1 are also the voltage electrodes for the current $I_{A0,f1}$ injected from electrode A0 to electrode A1 at a frequency f1. The current $I_{A0,f1}$ is provided by the current electrodes A0 and A1 for voltage difference between $V_{A0}$ at voltage electrode A0 and $V_{A1,f1}$ at voltage electrode A1 to be measured. In this case, current electrodes A0 and A2 are also the voltage electrodes for the current $I_{A0,f2}$ injected from electrode A0 to electrode A2 at a frequency f2. The current $I_{A0,f2}$ is provided by the current electrodes A0 and A2 for voltage difference between $V_{A0}$ at voltage electrode A0 and $V_{A1,f2}$ at voltage electrode A2 to be measured. As shown in FIG. 3C, current from location A0 to A1 can be generated at a frequency f1, while current from location A0 to A2 can be generated at a frequency f2, leading to two impedances defined as ratios as in FIGS. 3A-3B, but with one impedance correlated to frequency f1 and the other impedance correlated to frequency f2. As shown, in FIGS. 3A-3C, current can be injected from one electrode to another electrode with voltage differences measured between two electrodes that are disposed at or between the position of the electrodes injecting and receiving the current.

After the voltage is obtained, an impedance for that section of the pipe can be calculated by using Ohm's rule and dividing voltage by the current. The discrete impedances that are calculated can be interpolated/extrapolated to produce an impedance distribution across the well. This impedance distribution can provide an impedance profile. Effect of contact resistance can also be subtracted from the calculated impedance as a correction. In such case, contact resistance may be calculated from lab experiments or observations from the field tests. Again, the distance between the electrodes need to be chosen large enough to have large enough signal to noise ratio, however it also needs to be small enough to produce the depth resolution required in distance calculation. Ideal separation can range between 6 inches and 200 feet. In measurement of the impedance, the same excitation frequencies that are used in surface excitation need to be used. If different frequencies are used, impedance can be interpolated/extrapolated from the ones that are available. The current I(z1,z2) and voltage measurements along with the impedance Z(z1,z2) measurements are shown in FIGS. 3A-3C. Note that z1 is the start point and z2 is the end point of the excitation/measurement, respectively.

With respect to current profiling, since both surface excitation voltages and impedances along the producer are known from voltage profiling and impedance profiling, it is straightforward to compute the currents I(z1,z2,z3), by utilizing Ohm's rule, where z1 is the injection location, z2 is the return location, and z3 is the location of current.

$$I\left(z_{WH}, z_R, \frac{z_{M1} + z_{M2}}{2}\right) = \frac{V(z_{WH}, z_R, z_{M1}, z_{M2})}{Z(z_{M1}, z_{M2})} \quad (1)$$

Equation (1) gives the current at a position between locations M1 and M2 for current injected at the well head and returned to the selected return location with respect to the voltages measured between locations M1 and M2 and the impedance between locations M1 and M2. It is noted here that the above currents are computed based on the current positions of well casings and BHA's during the measurement of voltage and impedances. In the case of movement of the injector BHA or casing further down the subterranean environment, voltages and impedances may need to be updated/corrected. This can be accomplished by repeating the voltage or impedance profiling, or applying a correction to profiled voltages, impedances, or currents that take into account the new casing or BHA sections. Such corrections can be based on computer models of the producer, injector, and the formation layers. The voltage and impedance measurements can be used to solve for unknown formation and geometrical parameters, which can further assist this correction. These profiles can be stored in a memory for use during ranging operations.

Determination of the distance and direction of the target pipe can be performed based on the magnetic fields received by the receivers. This ranging can be achieved by utilizing the relationship between the pipe current and the received magnetic fields given by:

$$\overline{H}(z) = \frac{I(z_{WH}, z_R, z)}{2\pi r(z)} \hat{\phi}(z) \quad (2)$$

where H is the magnetic field vector, I is the current on the pipe which has been calculated in the previously discussed procedure, r is the shortest distance between the receivers and the pipe and φ is a vector that is perpendicular to both z axis of the receiver and the shortest vector that connects the pipe to the receivers. This simple relationship assumes constant pipe current along the pipe, however the procedures taught herein can be extended to any current distribution by using the appropriate model. An alternative calculation can be used to take into account variations of currents by utilizing appropriate weights. This formulation is straightforward and it is not included here. It can be clearly seen that both distance and direction can be calculated by using this relationship.

$$r(z) = \frac{I(z_{WH}, z_R, z)}{2\pi |\overline{H}(z)|} \quad (2)$$

$$\phi(z) = \text{angle}(\hat{x}H_x(z) + \hat{y}H_y(z)) + 90 \quad (3)$$

where $$\overline{H}(z) = \hat{x}H_x(z) + \hat{y}H_y(z) \quad (4)$$

$$|\overline{H}(z)| = \sqrt{H_x(z)^2 + H_y(z)^2}$$

It has been observed by experience that equation (3) provides a reliable way to measure the relative direction of the target pipe with respect to receiver coordinates and it can be used as long as the signal received from the pipe is substantially large compared to the measurement errors. Since currents are also explicitly measured and known, equation (2) provides also a reliable method for distance calculation and a gradient measurement is not required.

FIG. 4 is a schematic representation of an absolute measurement principle with respect to a target pipe 402 using a magnetic field sensor 415. Absolute measurement that is used can be performed using two (in case both wells are substantially parallel to each other) or three-axis magnetometers as shown in FIG. 4. In most ranging applications, the target casing is mostly parallel to the drilling well so that only x-axis and y-axis sensors are required in FIG. 4. Still, in practice a z-axis sensor can be used for less-parallel/non-parallel ranging cases to calibrate received signals at x-axis and y-axis sensors. $H_{x1}$ and $H_{y1}$ in FIG. 4 are considered as calibrated intensity in x-axis and y-axis sensors, respectively.

Receiver magnetic dipoles can be realized with magnetometers, atomic magnetometers, flux-gate magnetometers, solenoids, or coils. A standard MWD magnetometer can be used for ranging with current profiling based on well known measurement methods that are mainly used for magnetic guidance (MG).

Figure 5:
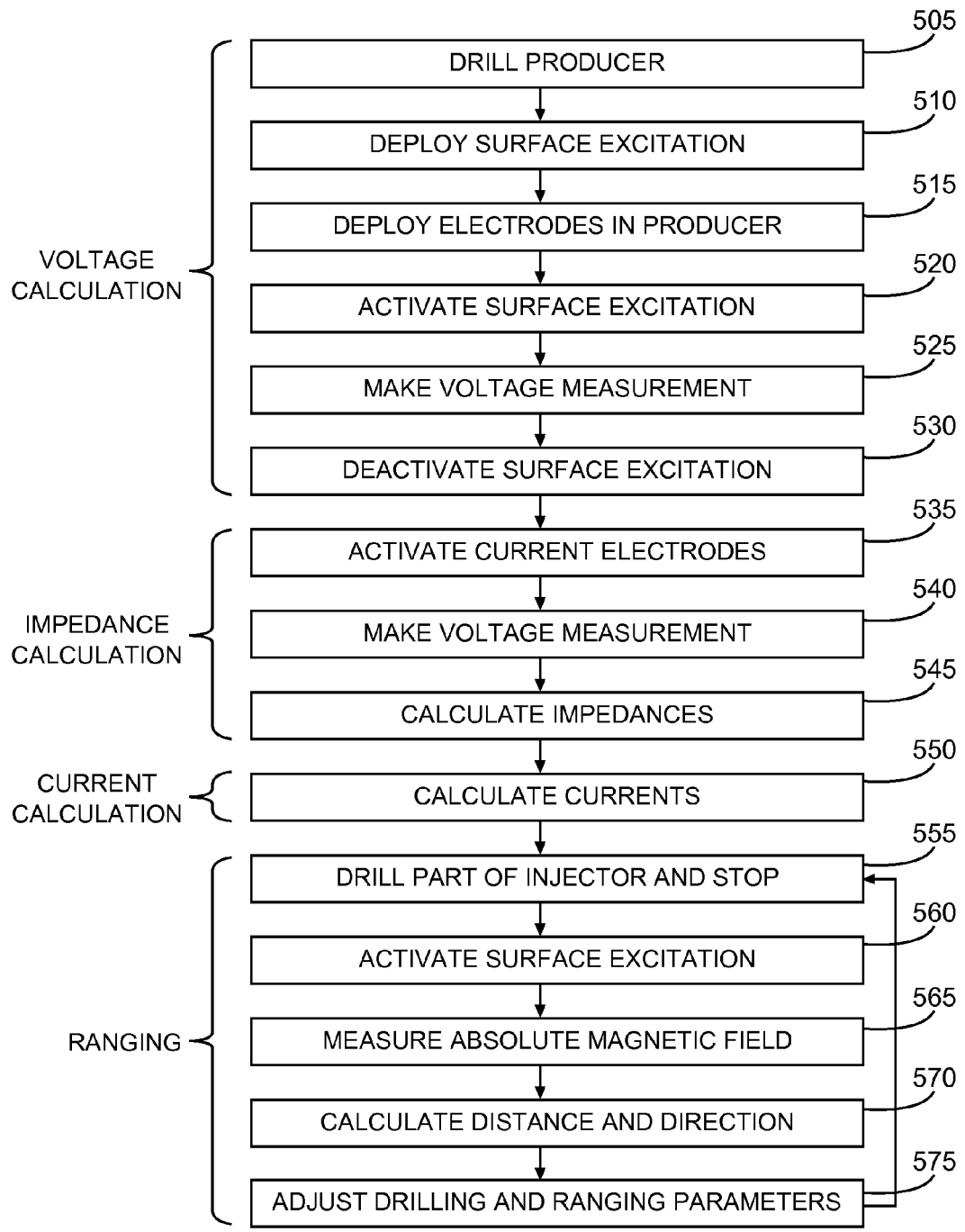
FIG. 5 is a flow diagram of features of an example system ranging operation, in accordance with various embodiments.

FIG. 5 is a flow diagram of features of an example system ranging operation. FIG. 5 shows a box chart describing an example embodiment of a system operation with respect to ranging relative to a producer well. At 505, the producer well is drilled. At 510, surface excitation is deployed. This deployment can be performed in the same way it will be used in the ranging operation. At 515, the voltage electrodes are deployed in the producer. These voltage electrodes can be deployed on a wireline structure. At 520, surface excitation is activated. At 525, the voltages that are produced on the electrodes are measured. Using these voltage measurements, a voltage profile across the producer can be constructed. At 530, the surface excitation is disabled. At 535, current electrodes are activated in the producer well. These current electrodes can be placed for impedance measurements. At 540, voltage measurements are made. Currents can also be measured. At 545, impedances are calculated. From the calculated impedances, an impedance profile of the producer well can be constructed. At 550, currents are calculated. Current is calculated from the previously determined voltage and impedance. A current profile can be obtained from the voltage and impedance profiles used to calculate the currents. Injector drilling is commenced. At 555, after a part of the injector is drilled, drilling is stopped. At 560, surface excitation is activated. The surface activation can be performed with the drilling stopped for accurate measurement. At 565, absolute magnetic fields are measured. At 570, distance and direction are calculated. These calculations can be performed from profiled currents and measured magnetic fields based on equations (2) and (3). At 575, drilling and ranging parameters are adjusted. Drilling can commence. The ranging operation can be repeated as desired. Operation of the surface excitation may also be adjusted based on operation of electromagnetic telemetry. As shown in FIG. 5, this example embodiment may be considered to have four stages: voltage calculation (determination of a voltage profile), impedance calculation (determination of an impedance profile), current calculation (determination of a current profile), and ranging.

Techniques, as taught herein, can allow accurate and deep distance calculation from absolute signals without relying on gradient signals. This calculation can be accomplished by profiling of producer well currents by an electrode tool that is lowered on a wireline. This profiling may be performed only once before the drilling such that ranging operations do not require two teams on producer and injector wells simultaneously, which can achieve significant savings. Due to operation based on the absolute signals, as opposed to currently available gradient tools, this tool has significantly larger range in accurate distance calculation on the order of 200 feet. It may effectively increase the range of accurate distance calculation by a factor of about 10 with respect to existing approaches.

Figure 6:
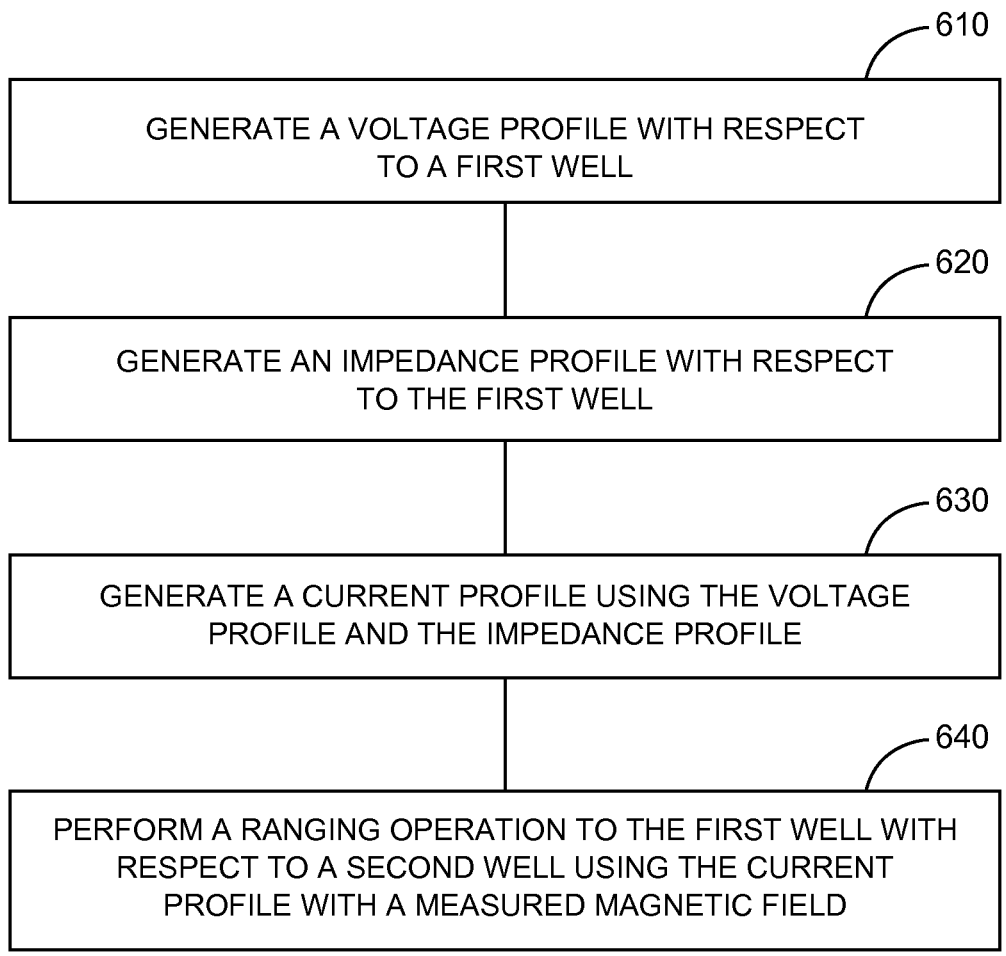
FIG. 6 is a flow diagram of features of an example method of ranging, in accordance with various embodiments.

FIG. 6 is a flow diagram of features of an example method of conducting a ranging operation with respect to a production well. At 610, a voltage profile with respect to a first well is generated. The first well can be a production well. The method can be performed with respect to a target well with an underground fixture having a conductive pipe-like structure. Ranging operations to the target well and associated structure, a first well, with respect to a second well can be translated to other wells. For instance, translation can be made with respect to a well having a known distance and direction to the target well. The voltage profile can be generated with respect to excitation measured by selected electrodes of a plurality of electrodes deployed along a pipe of the first well. Generating the voltage profile with respect to excitation can include activating an emitter at a surface from which the first well was formed. Generating the voltage profile with respect to excitation can include activating an emitter at a particular depth in the first well. Activating the emitter can include using voltage controlled or current controlled activation at frequencies in the range from about 0.02 Hz to about 250 Hz. Generating the voltage profile can include determining voltage differences between pairs of locations along the pipe of the first well for current injected at a well head of the first well with a current return at a location on a surface from which the first well was formed.

At 620, an impedance profile with respect to the first well is generated. The impedance profile can be generated with respect to position along the first well using selected electrodes of the plurality of electrodes. Generating the impedance profile can include injecting current from one electrode of the plurality of electrodes to another electrode of the plurality of electrodes and determining voltage differences between pairs of locations along the pipe between or at the location of the electrodes injecting and receiving the current.

At 630, a current profile is generated using the voltage profile and the impedance profile. At 640, a ranging operation to the first well with respect to a second well is performed using the current profile with a measured magnetic field. Performing the ranging operation can include performing a ranging operation with respect to an injector well in a SAGD application. Performing the ranging operation can include performing a ranging operation with respect the second well being a production well. In various embodiments, methods can include performing a ranging operation with respect to one or more wells that are different from the first and second wells.

Performing the ranging operation can include performing a ranging operation with respect to the second well after drilling a portion of the second well and after stopping the drilling. Performing the ranging operation can include determining distance and direction to the second well using a relationship between distance and a ratio of current to measured magnetic field at a depth, the current at the depth taken from the current profile at the depth for current injected at a well head of the first well with a current return at a location on a surface from which the first well was formed.

In various embodiments, methods can include repeating generating a voltage profile, generating an impedance profile, and generating a current profile after further drilling of the second well.

In various embodiments, a non-transitory machine-readable storage device can comprise instructions stored thereon, which, when performed by a machine, cause the machine to perform operations, the operations comprising one or more features similar to or identical to features of methods and techniques related to conducting a ranging operation with respect to a first well as described herein. The first well can be realized as a production well with respect to the instructions. The physical structure of such instructions may be operated on by one or more processors. Executing these physical structures can cause the machine to perform operations to: generate a voltage profile with respect to excitation measured by selected electrodes of a plurality of electrodes deployed along a pipe of a first well; generate an impedance profile with respect to position along the first well using selected electrodes of the plurality of electrodes; generate a current profile using the voltage profile and the impedance profile; and perform a ranging operation to the first well with respect to a second well using the current profile with a measured magnetic field.

The operations performed by the machine can include any of the operations described herein to conduct a ranging operation with respect to a well. The operations to perform the ranging operation can include performing a ranging operation with respect to an injector well in a SAGD application. The operations to generate the voltage profile with respect to excitation can include activation of an emitter at a surface from which the first well, such as a production well, was formed. The operations to generate the voltage profile with respect to excitation can include activation of an emitter at a particular depth in the first well. The activation of the emitter can include use of voltage controlled or current controlled activation at frequencies in the range from about 0.02 Hz to about 250 Hz.

The operations to generate the voltage profile can include determination of voltage differences between pairs of locations along the pipe of the first well for current injected at a well head of the first well with a current return at a location on a surface from which the first well was formed. The operations to generate the impedance profile can include injecting current from one electrode of the plurality of electrodes to another electrode of the plurality of electrodes and determining voltage differences between pairs of locations along the pipe between or at locations of the electrodes injecting and receiving the current. The operations to perform the ranging operation can include performance of a ranging operation with respect to the second well after drilling a portion of the second well and after stopping the drilling. The operations to perform the ranging operation can include determination of distance and direction to the second well by use of a relationship between distance and a ratio of current to measured magnetic field at a depth, the current at the depth taken from the current profile at the depth for current injected at a well head of the first well with a current return at location on a surface from which the first well was formed.

The operations can include repetition of the generation of a voltage profile, the generation of an impedance profile, and the generation of a current profile after further drilling of the second well. The operations can include operations where the second well is a production well. The operations can include performance of a ranging operation with respect to one or more wells that are different from the first and second wells.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Figure 7:
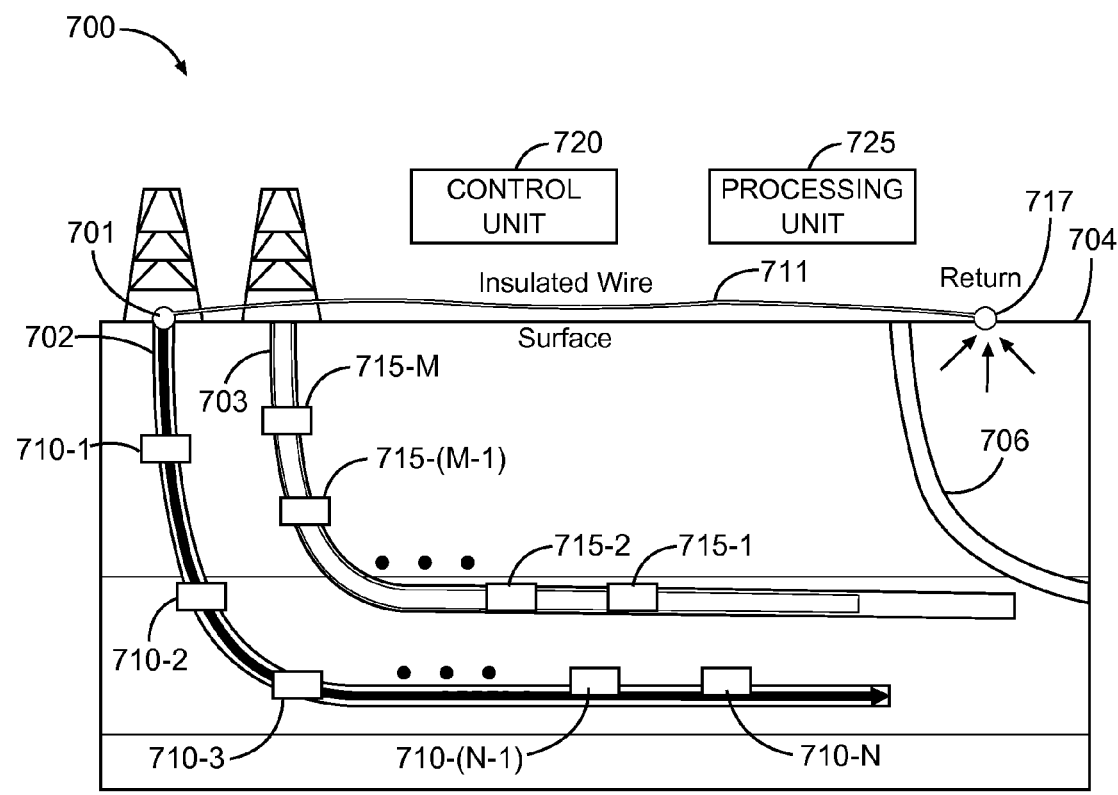
FIG. 7 is a schematic representation of features of an example system operable to conduct ranging operations to a production well, in accordance with various embodiments.

FIG. 7 is a schematic representation of features of an example system 700 operable to conduct a ranging operation with respect to a production well 702. System 700 can include an emitter 701, a plurality of electrodes 710-1, 710-2 . . . 710-(N−1), 710-N, a magnetic sensor 715-1, a control unit 720, and a processing unit 725. The plurality of electrodes 710-1, 710-2 . . . 710-(N−1), 710-N is capable of being deployed along a pipe of the production well 702. These electrodes may be mounted on a production tool capable of being deployed in the production well. These electrodes may be a part of an electrode-based formation logging tool. The magnetic sensor 715-1 is capable of being deployed along a second well 703. Multiple magnetic sensors 715-1, 715-2 . . . 715-(M−1), 715-M may be deployed along the second well 703. The control unit 720 can be arranged to control excitation to the production well 702 by the emitter 701, to control collection of voltages at selected electrodes of the plurality of electrodes 710-1, 710-2 . . . 710-(N−1), 710-N, to control generation of currents from selected electrodes of the plurality of electrodes 710-1, 710-2 . . . 710-(N−1), 710-N and collection of voltages based on the generation of the currents, and to control acquisition of a measured magnetic field from a magnetic sensor of the magnetic sensors 715-1, 715-2 . . . 715-(M−1), 715-M. The processing unit 725 can be operatively coupled to the control unit 720 and arranged to generate, from interaction with the control unit 720, a voltage profile, an impedance profile, and a current profile using the voltage profile and the impedance profile, the processing unit 725 to perform a ranging operation with respect to the second well 703 using the current profile with a measured magnetic field.

The emitter 701 can be disposed at a surface 704 from which the production well 702 was formed. The emitter 701 can be disposed in the first well. The emitter 701 can be coupled to a return 717 by an insulated wire 711. The control unit 720 can be arranged to activate the emitter 701 using voltage controlled or current controlled activation at frequencies in the range from about 0.02 Hz to about 250 Hz. The second well 703 can be an injector well in a SAGD application. The second well 703 can be a production well.

The system can be arranged to generate the voltage profile from determination of voltage differences between pairs of locations along the pipe of the production well 702 for current injected at a well head of the production well 702 with a current return at location on a surface 704 from which the production well 702 was formed. The processing unit 725 can be arranged to generate the impedance profile from injection of current from one electrode of the plurality of electrodes 710-1, 710-2 . . . 710-(N−1), 710-N to another electrode of the plurality of electrodes 710-1, 710-2 . . . 710-(N−1), 710-N and determination of voltage differences between pairs of locations along the pipe between or at locations of the electrodes injecting and receiving the current. The processing unit 725 can be arranged to determine distance and direction to the second well 703 using a relationship between distance and a ratio of current to measured magnetic field at a depth, the current at the depth taken from the current profile at the depth for current injected at a well head of the production well 702 with a current return at location on a surface 704 from which the production well 702 was formed.

The processing unit 725 can be arranged to perform a ranging operation with respect to the second well 703 after drilling a portion of the second well 703 and after stopping the drilling. The processing unit 725 can be arranged to perform a ranging operation with respect to a third well 706. The processing unit 725 can be arranged to perform a ranging operation with respect to one or more wells that are different from the first and second wells. Sensors similar or identical to magnetic sensors 715-1, 715-2 . . . 715-(M−1), 715-M can be deployed in the third well 706. The processing unit 725 and the control unit 720 can be arranged to repeat generation of a voltage profile, generation of an impedance profile, and generation of a current profile after further drilling of the second well 703. System 700 can include other features of embodiments taught herein.

Figure 8:
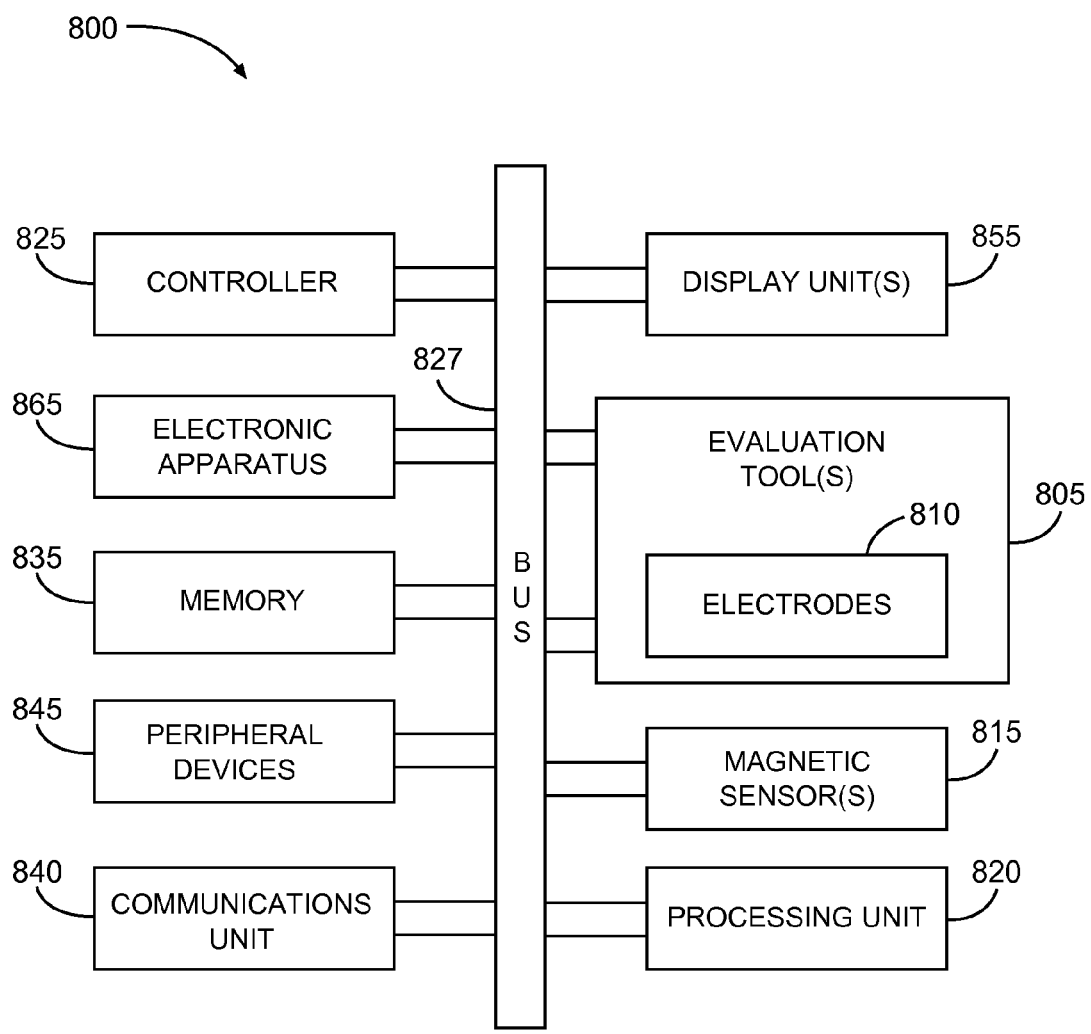
FIG. 8 is a block diagram of features of an example system operable to conduct ranging operations, in accordance with various embodiments.

FIG. 8 is a block diagram of features of an embodiment of an example system 800 operable to conduct a ranging operation as taught herein. The system can be operated with respect to a target well with an underground fixture having a conductive pipe-like structure in an identical or similar manner as with respect to a production well. Ranging operations to the target well and associated structure, a first well, with respect to a second well can be translated to other wells. For instance, translation can be made with respect to a well having a known distance and direction to the target well. The target well (first well) can be a production well. The system 800 can include a controller 825 and a memory unit 835. The controller 825 can include one or more processors. Memory unit 835 can be realized as one or more machine-readable storage devices having instructions stored thereon, which in conjunction with controller 825, when performed by the system 800, cause the system 800 to perform operations, the operations comprising analysis to conduct ranging operations with respect to a first well as taught herein.

The system 800 can include one or more evaluation tools 805 having a plurality of electrodes 810 operable to be deployed along the first well and to make measurements with respect to the first well to generate one or more voltage profiles, impedance profiles, and current profiles that can be used in ranging operations of the first well with respect to one or more other wells. The system 800 can include one or more magnetic sensors 815 deployable in the one or more other wells. The plurality of electrodes 810 may include an emitter that can be located at the well head of the first well. The plurality of electrodes 810 may be used in conjunction with a pipe of the first well.

The controller 825 and the memory unit 835 can be arranged to operate the one or more evaluation tools 805 to acquire data as the one or more evaluation tools 805 are operated to obtain profiles prior to ranging operations. The controller 825 and the memory unit 835 can be arranged to acquire data in ranging operations from the one or more magnetic sensors 815 in wells other than the first well, where the first well is the target of the ranging operation with respect to the other wells. The controller 825 and the memory unit 835 can be realized to manage processing schemes with respect to data as described herein. Alternatively, a processing unit 820 can be employed to manage processing schemes with respect to data as described herein.

The system 800 can also include an electronic apparatus 865 and a communications unit 840. Electronic apparatus 865 can be used in conjunction with the controller 825 to perform tasks associated with making measurements downhole with the one or more electrodes 810 of the one or more evaluation tools 805 and associated with acquiring signals from the one or more magnetic sensors 815. The communications unit 840 can include downhole communications in a drilling operation and in a production operation. The communications unit 840 can be structured as a distributed system including instrumentality for surface and networking communications.

The system 800 can also include a bus 827, where the bus 827 provides electrical conductivity among the components of the system 800. The bus 827 can include an address bus, a data bus, and a control bus, each independently configured. The bus 827 can also use common conductive lines for providing one or more of address, data, or control, the use of which can be regulated by the controller 825. The bus 827 can include optical transmission medium to provide optical signals among the various components of system 800. The bus 827 can be configured such that the components of the system 800 are distributed. The bus 827 may include network capabilities.

In various embodiments, peripheral devices 845 can include displays, additional storage memory, and/or other control devices that may operate in conjunction with the controller 825 and/or the memory unit 835. The peripheral devices 845 can be arranged to operate in conjunction with display unit(s) 855 with instructions stored in the memory unit 835 to implement a user interface to manage the operation of the one or more evaluation tools 805 and/or components distributed within the system 800. Such a user interface can be operated in conjunction with the communications unit 840 and the bus 827. The display unit(s) 855 can be arranged to present actions to be taken resulting from the memory unit 835 in conjunction with the processing unit 820 to conducting ranging operations with respect to a first well, such as but not limited to a production well, as taught herein.

In various embodiments, a method can include processes to perform ranging operations, where the method has various combinations of features as described herein. Features of a method may be used in other methods. In various embodiments, an example method 1 comprises: generating a voltage profile with respect to excitation measured by selected electrodes of a plurality of electrodes deployed along a pipe of a first well; generating an impedance profile with respect to position along the first well using selected electrodes of the plurality of electrodes; generating a current profile using the voltage profile and the impedance profile; and performing a ranging operation to the first well with respect to a second well using the current profile with a measured magnetic field.

An example method 2 can include the features of example method 1 and can include the first well being a production well.

An example method 3 can include the features or combinations of features of any of example methods 1-2 and can include performing the ranging operation to include performing a ranging operation with respect to an injector well in a steam assisted gravity drainage (SAG) application.

An example method 4 can include the features or combinations of features of any of example methods 1-3 and can include generating the voltage profile with respect to excitation to include activating an emitter at a surface from which the first well was formed.

An example method 5 can include the features or combinations of features of any of example methods 1-4 and can include generating the voltage profile with respect to excitation to include activating an emitter at a particular depth in the first well.

An example method 6 can include the features or combinations of features of any of example methods 1-5 and can include activating an emitter to include using voltage controlled or current controlled activation at frequencies in the range from about 0.02 Hz to about 250 Hz.

A example method 7 can include the features or combinations of features of any of example methods 1-6 and can include generating the voltage profile to include determining voltage differences between pairs of locations along the pipe of the first well for current injected at a well head of the first well with a current return at a location on a surface from which the first well was formed.

A example method 8 can include the features or combinations of features of any of example methods 1-7 and can include generating the impedance profile includes injecting current from one electrode of the plurality of electrodes to another electrode of the plurality of electrodes and determining voltage differences between pairs of locations along the pipe between or at the location of the electrodes injecting and receiving the current.

An example method 9 can include the features or combinations of features of any of example methods 1-8 and can include performing the ranging operation to include performing a ranging operation with respect to the second well after drilling a portion of the second well and after stopping the drilling.

A example method 10 can include the features or combinations of features of any of example methods 1-9 and can include performing the ranging operation to include determining distance and direction to the second well using a relationship between distance and a ratio of current to measured magnetic field at a depth, the current at the depth taken from the current profile at the depth for current injected at a well head of the first well with a current return at a location on a surface from which the first well was formed.

An example method 11 can include the features or combinations of features of any of example methods 1-10 and can include repeating generating a voltage profile, generating an impedance profile, and generating a current profile after further drilling of the second well.

An example method 12 can include the features or combinations of features of any of example methods 1-11 and can include the second well being a production well.

An example method 13 can include the features or combinations of features of any of example methods 1-12 and can include performing a ranging operation with respect to one or more wells that are different from the first and second wells.

Features of any of example methods 1-13 or other combinations of features, as taught herein, may be combined into a procedure according to the teachings herein.

In various embodiments, an example machine-readable storage device 1 has instructions stored thereon, which, when performed by a machine, cause the machine to perform operations, the operations comprising operations to: generate a voltage profile with respect to excitation measured by selected electrodes of a plurality of electrodes deployed along a pipe of a first well; generate an impedance profile with respect to position along the first well using selected electrodes of the plurality of electrodes; generate a current profile using the voltage profile and the impedance profile; and perform a ranging operation to the first well with respect to a second well using the current profile with a measured magnetic field.

An example machine-readable storage device 2 can include the features or combinations of features of example machine-readable storage device 1 and can include the first well being a production well.

An example machine-readable storage device 3 can include the features or combinations of features of any of example machine-readable storage devices 1-2 and can include operations to perform the ranging operation to include performance of a ranging operation with respect to an injector well in a steam assisted gravity drainage (SAG) application.

An example machine-readable storage device 4 can include the features or combinations of features of any of example machine-readable storage devices 1-3 and can include operations to generate the voltage profile with respect to excitation to include activation of an emitter at a surface from which the first well was formed.

An example machine-readable storage device 5 can include the features or combinations of features of any of example machine-readable storage devices 1-4 and can include operations to generate the voltage profile with respect to excitation includes activation of an emitter at a particular depth in the first well.

An example machine-readable storage device 6 can include the features or combinations of features of any of example machine-readable storage devices 1-5 and can include activation of the emitter includes use of voltage controlled or current controlled activation at frequencies in the range from about 0.02 Hz to about 250 Hz.

An example machine-readable storage device 7 can include the features or combinations of features of any of example machine-readable storage devices 1-6 and can include operations to generate the voltage profile to include determination of voltage differences between pairs of locations along the pipe of the first well for current injected at a well head of the first well with a current return at a location on a surface from which the first well was formed.

An example machine-readable storage device 8 can include the features or combinations of features of any of example machine-readable storage devices 1-7 and can include operations to generate the impedance profile to include injection of current from one electrode of the plurality of electrodes to another electrode of the plurality of electrodes and determination of voltage differences between pairs of locations along the pipe between or at locations of the electrodes injecting and receiving the current.

An example machine-readable storage device 9 can include the features or combinations of features of any of example machine-readable storage devices 1-8 and can include operations to perform the ranging operation to include performance of a ranging operation with respect to the second well after drilling a portion of the second well and after stopping the drilling.

An example machine-readable storage device 10 can include the features or combinations of features of any of example machine-readable storage devices 1-9 and can include operations to perform the ranging operation to include determination of distance and direction to the second well by use of a relationship between distance and a ratio of current to measured magnetic field at a depth, the current at the depth taken from the current profile at the depth for current injected at a well head of the first well with a current return at location on a surface from which the first well was formed.

An example machine-readable storage device 11 can include the features or combinations of features of any of example machine-readable storage devices 1-10 and can include repetition of the generation of a voltage profile, the generation of an impedance profile, and the generation of a current profile after further drilling of the second well.

An example machine-readable storage device 12 can include the features or combinations of features of any of example machine-readable storage devices 1-11 and can include the second well being a production well.

An example machine-readable storage device 13 can include the features or combinations of features of any of example machine-readable storage devices 1-12 and can include performance of a ranging operation with respect to one or more wells that are different from the first and second wells.

An example machine-readable storage device 14 can have instructions stored thereon, which, when performed by a machine, cause the machine to perform operations, the operations comprising operations to perform any of the example methods 1-13 or other combinations of features as taught herein.

In various embodiments, an example system 1 comprises: an emitter; a plurality of electrodes capable of being deployed along a pipe of a first well; a magnetic sensor capable of being deployed along a second well; a control unit arranged to control excitation to the first well by the emitter, to control collection of voltages at selected electrodes of the plurality of electrodes, to control generation of currents from selected electrodes of the plurality of electrodes and collection of voltages based on the generation of the currents, and to control acquisition of a measured magnetic field from the magnetic sensor; and a processing unit operatively coupled to the control unit and arranged to generate, from interaction with the control unit, a voltage profile, an impedance profile, and a current profile using the voltage profile and the impedance profile, the processing unit to perform a ranging operation to the first well with respect to the second well using the current profile with a measured magnetic field.

An example system 2 can include the features or combinations of features of example system land can include the first well being a production well.

An example system 3 can include the features or combinations of features of any of example systems 1-2 and can include the second well being an injector well in a steam assisted gravity drainage (SAG) application.

An example system 4 can include the features or combinations of features of any of example systems 1-3 and can include the emitter being disposed at a surface from which the first well was formed.

An example system 5 can include the features or combinations of features of any of example systems 1-4 and can include the emitter being disposed in the first well.

An example system 6 can include the features or combinations of features of any of example systems 1-5 and can include the control unit arranged to activate the emitter using voltage controlled or current controlled activation at frequencies in the range from about 0.02 Hz to about 250 Hz.

An example system 7 can include the features or combinations of features of any of example systems 1-6 and can include the processing unit arranged to generate the voltage profile from determination of voltage differences between pairs of locations along the pipe of the first well for current injected at a well head of the first well with a current return at location on a surface from which the first well was formed.

An example system 8 can include the features or combinations of features of any of example systems 1-7 and can include the processing unit arranged to generate the impedance profile from injection of current from one electrode of the plurality of electrodes to another electrode of the plurality of electrodes and determination of voltage differences between pairs of locations along the pipe between or at locations of the electrodes injecting and receiving the current.

An example system 9 can include the features or combinations of features of any of example systems 1-8 and can include the control unit and the processing unit arranged to perform a ranging operation with respect to the second well after drilling a portion of the second well and after stopping the drilling.

An example system 10 can include the features or combinations of features of any of example systems 1-9 and can include the processing unit arranged to determine distance and direction to the second well using a relationship between distance and a ratio of current to measured magnetic field at a depth, the current at the depth taken from the current profile at the depth for current injected at a well head of the first well with a current return at location on a surface from which the first well was formed.

An example system 11 can include the features or combinations of features of any of example systems 1-10 and can include the processing unit and the control unit arranged to repeat generation of a voltage profile, generation of an impedance profile, and generation of a current profile after further drilling of the second well.

An example system 12 can include the features or combinations of features of any of example systems 1-11 and can include the second well being a production well.

An example system 13 can include the features or combinations of features of any of example systems 1-12 and can include the control unit and the processing unit are arranged to perform a ranging operation with respect to one or more wells that are different from the first and second wells.

Features of any of example system 1-13 or other combinations of features, as taught herein, may be combined into a system according to the teachings herein.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:
1. A method comprising:
generating a voltage profile with respect to excitation measured by selected electrodes of a plurality of electrodes deployed along a conductive pipe of a first well;
generating an impedance profile with respect to position along the first well using selected electrodes of the plurality of electrodes;
generating a current profile using the voltage profile and the impedance profile; and
performing a ranging operation to the first well with respect to a second well using the current profile with a magnetic field that is measured from the second well.

2. The method of claim 1, wherein the first well is a production well.

3. The method of claim 2, wherein performing the ranging operation includes performing a ranging operation with respect to an injector well in a steam assisted gravity drainage (SAGD) application.

4. The method of claim 1, wherein generating the voltage profile with respect to excitation includes activating an emitter at a surface from which the first well was formed.

5. The method of claim 4, wherein activating the emitter includes using voltage controlled or current controlled activation at frequencies in the range from 0.02 Hz to 250 Hz.

6. The method of claim 1, wherein generating the voltage profile includes determining voltage differences between pairs of locations along the pipe of the first well for current injected at a well head of the first well with a current return at a location on a surface from which the first well was formed.

7. The method of claim 1, wherein generating the impedance profile includes injecting current from one electrode of the plurality of electrodes to another electrode of the plurality of electrodes and determining voltage differences between pairs of locations along the pipe between or at the location of the electrodes injecting and receiving the current.

8. The method of claim 1, wherein performing the ranging operation includes performing a ranging operation with respect to the second well after drilling a portion of the second well and after stopping the drilling.

9. The method of claim 1, wherein performing the ranging operation includes determining distance and direction to the second well using a relationship between distance and a ratio of current to measured magnetic field at a depth, the current at the depth taken from the current profile at the depth for current injected at a well head of the first well with a current return at a location on a surface from which the first well was formed.

10. The method of claim 1, wherein the method includes repeating generating a voltage profile, generating an impedance profile, and generating a current profile after further drilling of the second well.

11. The method of claim 1, wherein the second well is a production well.

12. The method of claim 1, wherein the method includes performing a ranging operation with respect to one or more wells that are different from the first and second wells.

13. A non-transitory machine-readable storage device having instructions stored thereon, which, when performed by a machine, cause the machine to perform operations, the operations comprising operations to:
generate a voltage profile with respect to excitation measured by selected electrodes of a plurality of electrodes deployed along a conductive pipe of a first well;
generate an impedance profile with respect to position along the first well using selected electrodes of the plurality of electrodes;
generate a current profile using the voltage profile and the impedance profile; and
perform a ranging operation to the first well with respect to a second well using the current profile with a magnetic field that is measured from the second well.

14. The non-transitory machine-readable storage device of claim 13, wherein the first well is a production well.

15. The non-transitory machine-readable storage device of claim 14, wherein operations to
perform the ranging operation include performance of a ranging operation with respect to an injector well in a steam assisted gravity drainage (SAGD) application.

16. The non-transitory machine-readable storage device of claim 13, wherein operations to generate the voltage profile with respect to excitation includes activation of an emitter at a surface from which the first well was formed.

17. The non-transitory machine-readable storage device of claim 16, wherein activation of the emitter includes use of voltage controlled or current controlled activation at frequencies in the range from 0.02 Hz to 250 Hz.

18. The non-transitory machine-readable storage device of claim 13, wherein operations to generate the voltage profile includes determination of voltage differences between pairs of locations along the pipe of the first well for current injected at a well head of the first well with a current return at a location on a surface from which the first well was formed.

19. The non-transitory machine-readable storage device of claim 13, wherein operations to generate the impedance profile includes injection of current from one electrode of the plurality of electrodes to another electrode of the plurality of electrodes and determination of voltage differences between pairs of locations along the pipe between or at locations of the electrodes injecting and receiving the current.

20. The non-transitory machine-readable storage device of claim 13, wherein operations to perform the ranging operation includes performance of a ranging operation with respect to the second well after drilling a portion of the second well and after stopping the drilling.

21. The non-transitory machine-readable storage device of claim 13, wherein operations to perform the ranging operation includes determination of distance and direction to the second well by use of a relationship between distance and a ratio of current to measured magnetic field at a depth, the current at the depth taken from the current profile at the depth for current injected at a well head of the first well with a current return at location on a surface from which the first well was formed.

22. The non-transitory machine-readable storage device of claim 13, wherein
the operations include repetition of the generation of a voltage profile, the generation of an impedance profile, and the generation of a current profile after further drilling of the second well.

23. The non-transitory machine-readable storage device of claim 13, wherein
the second well is a production well.

24. The non-transitory machine-readable storage device of claim 13, wherein the operations include performance of a ranging operation with respect to one or more wells that are different from the first and second wells.

25. A system comprising:
an emitter positioned at a well head of a first well;
a plurality of electrodes deployed along a conductive pipe of a first well;
a magnetic sensor deployed along a second well;
a control unit arranged to,
control excitation to the first well by the emitter, to control collection of voltages at selected electrodes of the plurality of electrodes, to control generation of currents from selected electrodes of the plurality of electrodes and collection of voltages based on the generation of the currents, and to control acquisition of a measured magnetic field from the magnetic sensor; and
a processing unit operatively coupled to the control unit and arranged to generate, from interaction with the control unit, a voltage profile, an impedance profile, and a current profile using the voltage profile and the impedance profile, the processing unit to perform a ranging operation to the first well with respect to the second well using the current profile with a measured magnetic field.

26. The system of claim 25, wherein the first well is a production well.

27. The system of claim 26, wherein the second well is an injector well in a steam assisted gravity drainage (SAGD) application.

28. The system of claim 25, wherein the emitter is disposed at a surface from which the first well was formed.

29. The system of claim 25, wherein the emitter is disposed in the first well.

30. The system of claim 25, wherein the control unit is arranged to activate the emitter using voltage controlled or current controlled activation at frequencies in the range from 0.02 Hz to 250 Hz.

31. The system of claim 25, wherein the processing unit is arranged to generate the voltage profile from determination of voltage differences between pairs of locations along the pipe of the first well for current injected at a well head of the first well with a current return at location on a surface from which the first well was formed.

32. The system of claim 25, wherein the processing unit is arranged to generate the impedance profile from injection of current from one electrode of the plurality of electrodes to another electrode of the plurality of electrodes and determination of voltage differences between pairs of locations along the pipe between or at locations of the electrodes injecting and receiving the current.

33. The system of claim 25, wherein the control unit and the processing unit are arranged to perform a ranging operation with respect to the second well after drilling a portion of the second well and after stopping the drilling.

34. The system of claim 25, wherein the processing unit is arranged to determine distance and direction to the second well using a relationship between distance and a ratio of current to measured magnetic field at a depth, the current at the depth taken from the current profile at the depth for current injected at a well head of the first well with a current return at location on a surface from which the first well was formed.

35. The system of claim 25, wherein the processing unit and the control unit are arranged to repeat generation of a voltage profile, generation of an impedance profile, and generation of a current profile after further drilling of the second well.

36. The system of claim 25, wherein the second well is a production well.

37. The system of claim 25, wherein the control unit and the processing unit are arranged to perform a ranging operation with respect to one or more wells that are different from the first and second wells.

38. The method of claim 1, wherein said generating a voltage profile includes,
injecting a current at a well head of the first well; and
measuring voltage differences associated with the injected current between two or more of the plurality of electrodes.

39. The method of claim 38, wherein the selected electrodes comprise a first and a second pair of electrodes, wherein both of the second pair of electrodes are positioned between the first pair of electrodes along the pipe, and wherein both of the first pair of electrodes are positioned substantially below the well head along the pipe, said generating an impedance profile including:
injecting a current from one of the first pair of electrodes to the other of the first pair of electrodes; and
measuring a voltage difference across the second pair of electrodes.

40. The method of claim 1, wherein the ranging operation is a distance to the first well with respect to the second well.

41. A non-transitory machine-readable storage device of claim 13, wherein the ranging operation is a distance to the first well with respect to the second well.

42. The system of claim 25, wherein the ranging operation is a distance to the first well with respect to the second well.

\* \* \* \* \*